(12) United States Patent
Brown et al.

(10) Patent No.: US 6,397,515 B1
(45) Date of Patent: Jun. 4, 2002

(54) ELECTRONIC FLY TRAP

(76) Inventors: Jeffrey K. Brown; Helena C. Brown, both of 4529Acadia Cove, Niceville, FL (US) 32579

( * ) Notice: Subject to any disclaimer, the term of this patent is extended or adjusted under 35 U.S.C. 154(b) by 0 days.

(21) Appl. No.: 09/752,554

(22) Filed: Jan. 3, 2001

Related U.S. Application Data

(60) Provisional application No. 60/177,196, filed on Jan. 21, 2000, and provisional application No. 60/232,604, filed on Sep. 14, 2000.

(51) Int. Cl.$^7$ .............................................. A01M 1/04
(52) U.S. Cl. .......................................... 43/113; 43/114
(58) Field of Search .......................... 43/112, 113, 114, 43/116, 118, 122; 52/243.1

(56) References Cited

U.S. PATENT DOCUMENTS

| | | | | |
|---|---|---|---|---|
| 4,117,624 A | * | 10/1978 | Phillips | 43/113 |
| 5,231,790 A | * | 8/1993 | Dryden et al. | 43/113 |
| 5,513,465 A | * | 5/1996 | Demarest et al. | 43/113 |
| 5,722,199 A | * | 3/1998 | Demarest et al. | 43/113 |
| 5,915,948 A | * | 6/1999 | Kunze et al. | 43/114 |
| 5,950,355 A | * | 9/1999 | Gilbert | 43/113 |
| 5,974,727 A | * | 11/1999 | Gilbert | 43/113 |
| 6,023,896 A | * | 2/2000 | Rothschild | 52/243.1 |
| 6,199,315 B1 | * | 3/2001 | Suzue et al. | 43/113 |

FOREIGN PATENT DOCUMENTS

DE          3840440 A1  * 10/1989  ............... 43/113

* cited by examiner

*Primary Examiner*—Robert P. Swiatek
*Assistant Examiner*—David Parsley
(74) *Attorney, Agent, or Firm*—Rodger H. Flagg

(57) ABSTRACT

An electronic fly trap apparatus having a housing with an upper housing aperture. A removable front panel is placed over the upper housing aperture, and at least one fly access aperture extends through the removable front panel. At least one light is positioned in the lower portion of the housing. Flies are drawn into the housing by the light, and the warmth and sound generated by the light. A disposable sheet having a plurality of apertures therethrough is positioned above the source of light. A sticky adhesive is disposed upon the upper surface of the disposable sheet. A curved, light reflective panel extends behind and above the disposable sheet. Reflected light passing through the plurality of apertures in the disposable sheet, are redirected by the light reflective surface to pass through the access aperture(s) in the front panel, to attract flying insects within the housing.

18 Claims, 5 Drawing Sheets

ELECTRONIC FLY TRAP

This patent application claims priority of provisional patent applications Ser. No. 60/177,196 filed Jan. 21, 2000 and Ser. No. 60/232,604 filed Sep. 14, 2000, and these provisional patent applications are incorporated by reference herein.

FIELD OF THE INVENTION

This invention relates to electronic fly traps, and more particularly to electronic fly traps utilizing visible light to attract flying insects, such as flies, which enter an enclosure, and are entrapped upon a sticky surface as they approach a light source located beneath a disposable sheet having a plurality of apertures, with a sticky surface thereon.

BACKGROUND OF THE INVENTION

Flies breed and feed on filth. Flies spread pathogens that carry many diseases, such as Typhoid fever, Salmonella, dysentery, epidemic diarrhea and intestinal parasites. Each fly carries up to six million bacteria. Flies are attracted by sight, sound and scent to the source of light, vibrations and food. Flies are commonly found in restaurants, hospitals, nursing homes, planes, trains, cruise ships, retail food stores, and food processing facilities, wherever a source of food is found.

There are four principal ways in which files spread pathogens that cause disease.
1. Flies do not have chewing or biting mouth parts. A fly must regurgitate digestive enzymes onto its food. As the enzymes dissolve the food, the fly sucks up the nutrients through its feeding tube. The flies' mouth parts and enzymes contaminate the food.
2. Flies have setae or hairs all over their body parts. These hairs are involved in the sensory collection of stimuli. The hairs also collect bacteria and other microorganisms. The flies contaminate the surfaces on which they walk, and flies shed these contaminates as they fly. Contaminates from flying insects may remain airborne for hours.
3. Flies frequently evacuate their alimentary canal, leaving fly spots wherever they happen to land. These fly spots are unsightly and unsanitary.
4. Female flies lay eggs in food. The eggs become soft-bodied legless larva, or maggots, which feed on the food. Maggots are unsightly, unsanitary and spoil the food.

Many attempts have been made to eliminate flies in proximity to food and people, with mixed results. Attempts have been made to electrocute flies, in apparatus known generally as "bug zappers". These devices attract flies to a source of light, and electrically charged wires in proximity to the lights serve to electrocute the flies upon contact with the electrically charged wires. It has been found that electrocuted flies tend to explode, sending fly fragments in all directions. Thus, their use in proximity to food or people is not recommended, and these bug zappers are not recommended for use indoors. Field tests have shown that more than ninety percent of the flies killed by bug zappers are male flies. Thus, most female, egg laying flies are not killed by bug zappers.

The use of fly paper for catching flies is also well known. Flies are attracted to the area by sight, sound and/or smell, and become stuck on the fly paper, where they remain glued to the fly paper until the fly paper is removed. The efficiency of fly paper is limited to its size and location. Left in the open, fly paper is messy, unsightly, and difficult to handle without coming in contact with flies stuck on the glued surface.

Previous attempts have been made to attract flies with fluorescent lights, where they become stuck on fly paper located in proximity to the source of light. The fly paper is typically located behind or below the lights. While these devices are improvements on bug zappers and randomly placed fly paper, the light source and surrounding area quickly becomes spotted and contaminated in the presence of flies. Such devices are often difficult to clean and keep in good working order.

Silvandersson, a Swedish Company, has successfully marketed "the Window" fly trap, prior to 1992. This fly trap comprises a light transmissive sheet having an adhesive adhered to one surface. A backing sheet is removed to expose the adhesive prior to use. The fly trap is placed upon a window surface, and the flies are trapped by the adhesive as they attempt to find a passage way through the window. Silvandersson's address is: Silvandersson Miijo A B, Box 56, SE-310 20 Knared.

U.S. Pat. No. 5,974,727 issuing to David Gilbert on Nov. 2, 1999 discloses a decorative flying insect trap using light, with fly paper located below the light.

U.S. Pat. No. 5,950,355 issuing to David Gilbert on Sep. 14, 1999 discloses a flying insect trap having a cardboard strip with adhesive located below the light source.

U.S. Pat. No. 5,651,211 issuing to Harold Regan et al. on Jul. 29, 1997, discloses a wall mounted trap for flies and insects, wherein the light is positioned above a sticky surface mounted on a rotatable cartridge.

U.S. Pat. No. 5,425,197 issuing to Colin Smith on Jun. 20, 1995 discloses a device for trapping insects having a light source which illuminates an adhesive surface which is continuously or intermittently rolled to avoid a build up of trapped insects.

U.S. Pat. No. 4,117,624 issuing to Dennis Phillips on Oct. 3, 1978 discloses an insect trap having a light source having a sticky substance located on a reflective surface positioned behind and below the light source.

U.S. Pat. No. 4,074,457 issuing to Hotoshi Sato et al on Feb. 21, 1978 discloses an insect catcher having a fluorescent lamp and vertically aligned sticky band located below the light source.

SUMMARY OF THE INVENTION

Thus, what is needed, is an efficient, attractive electronic fly trap, which may be wall mounted, or placed on a suitable horizontal surface, such as a table or countertop. The apparatus should be easy to maintain and clean. It preferably has two side by side light sources, one operable at a first frequency above a given threshold, and a second operable at a second frequency below a given threshold. A disposable sheet with a plurality of apertures therethrough, is substantially covered with a sticky adhesive. The disposable sheet is located above the light sources. The plurality of apertures in the disposable sheet allow heat and light to pass therethrough. The plurality of apertures are sized to restrict the passage of flies and most other flying insects. Preferably, the disposable sheet is a light transmissive disposable sheet.

A reflective panel redirects the light passing through the disposable sheet and the sticky adhesive, redirecting the light to pass through at least one elongated aperture in a removable front panel. The removable front panel may include indicia, such as a design, name, sign, advertisement, logo, trademark or slogan. The elongated aperture in the removable front panel provides access to flies and other flying insects into the housing. The flies are drawn into the housing by the light, by one or more frequencies generated by at least one electronic ballast and by at least one transformer, and by the warmth generated by the lights. The disposable sheet is preferably light transmissive. A sticky adhesive is mounted on the upper surface of the disposable sheet. The adhesive surface captures flies, and other flying insects, which land on the adhesive surface as they are drawn towards the light. The disposable sheet is easy to install and remove from the housing. A tab portion preferably extends beyond the sticky surface, and provides a convenient way to handle the disposable sheet, without making contact with the insects entrapped upon the sticky substance. A reflective surface extends behind and above the disposable light transmissive sheet. Light passing through the disposable sheet, is redirected by the reflective surface, to pass through at least one aperture located in the removable cover, to attract flying insects into the housing.

Other objectives and advantages of this invention will become apparent from the following description taken in conjunction with the accompanying drawings wherein certain example embodiments are set fourth by way of illustration in the accompanying drawings and description provided herein. The various features of novelty, which characterize this invention, are pointed out with particularity in the claims annexed to and forming a part of this disclosure.

BRIEF DESCRIPTION OF THE DRAWINGS

The invention will be better understood and objects and advantages will become apparent when consideration is given to the following detailed description thereof, which makes reference to the annexed drawings, wherein.

Please note that the same reference numerals refer to the same component parts throughout the various figures.

DESCRIPTION OF THE PREFERRED EMBODIMENT

Figure 1:
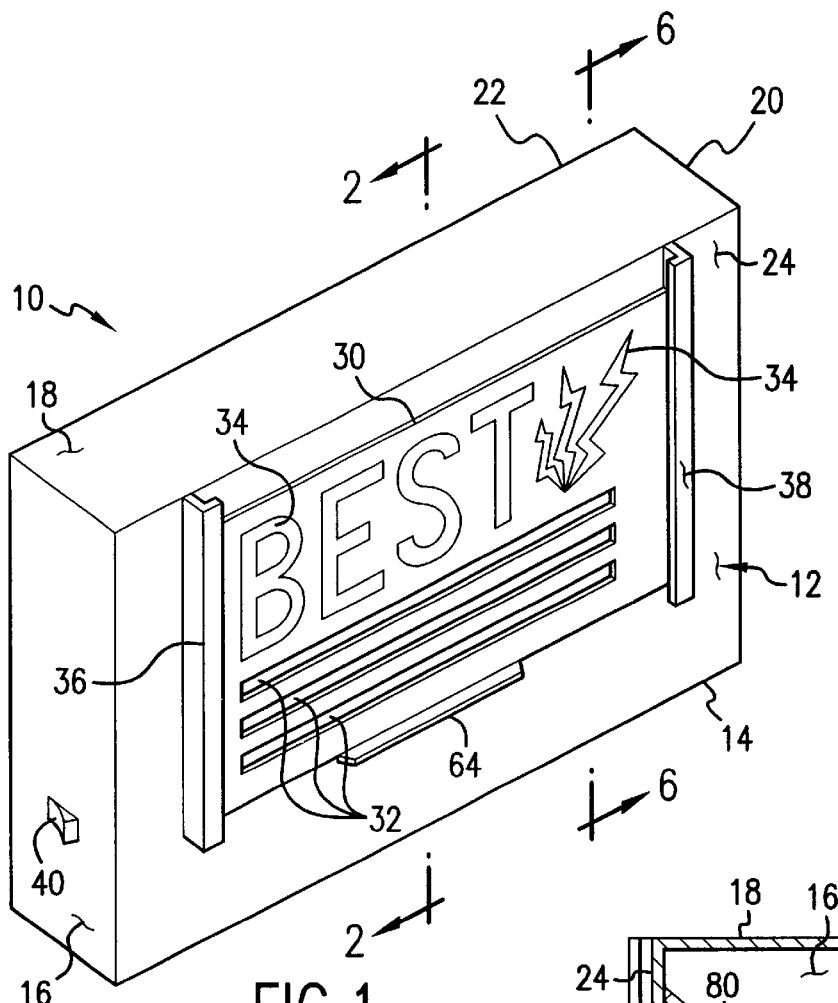
FIG. 1 is a perspective view of the electronic fly trap apparatus, shown with removable front cover attached.

With reference to the drawings, FIG. 1 through FIG. 9, the electronic fly trap apparatus 10, comprises a housing 12, having a bottom side 14, a first side 16, a top side 18, a second side 20, a back side 22, and a front side 24.

Figure 7:
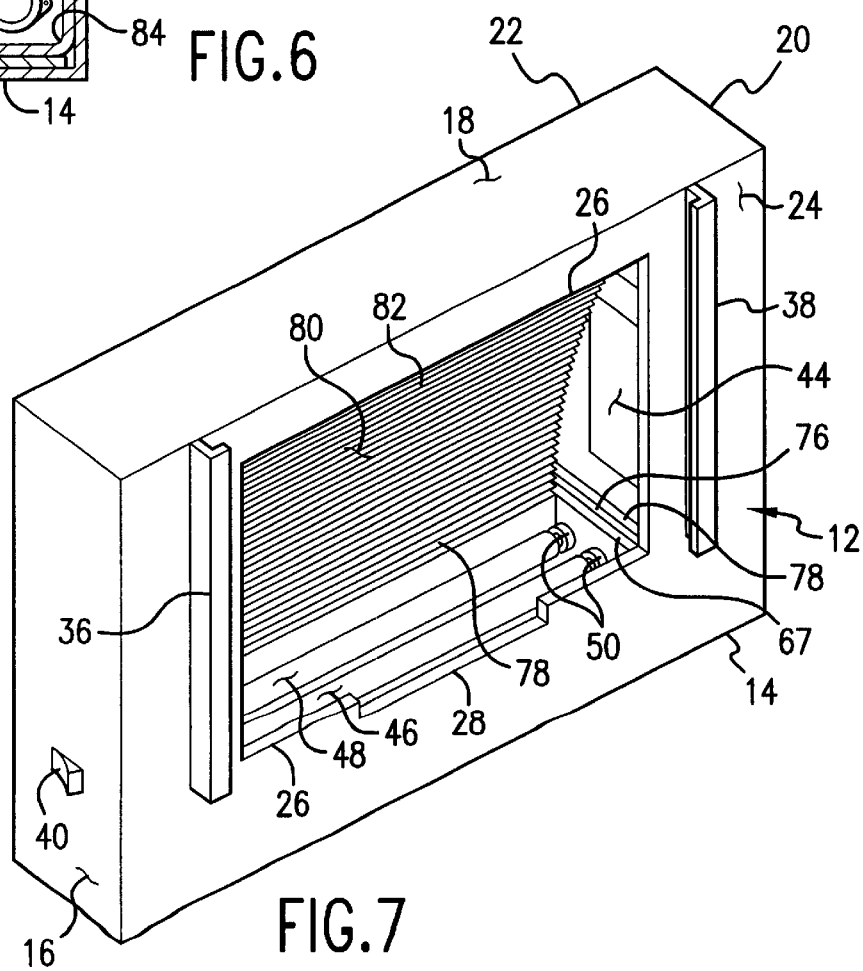
FIG. 7A is a perspective view of the fly trap apparatus shown with the removable cover and disposable sheet removed.

As best shown in FIG. 7, the front side 24 of the housing 12 has an upper housing aperture 26 extending at least half the width of the front side 24 of the electronic fly trap apparatus 10. The upper housing aperture 26 provides access to the internal components of this electronic fly trap apparatus 10. A tab slot 28 is preferably located along the lower portion of the front aperture 26. The tab slot 28 aids alignment of the disposable sheet 60 within the housing 12.

Referring now to FIG. 1, a removable front panel 30 includes at least one panel aperture 32 which provides access to flying insects, such as flies (not shown) into the electronic fly trap apparatus 10. The panel aperture(s) 32 are preferably elongated as shown in FIG. 1. Where multiple panel apertures 32 are used, the panel apertures 32 may be of several sizes. The panel apertures 32 may also be of various shapes, such as numbers, letters, designs, symbols, trademarks, logos, advertising and slogans. The panel apertures 32 provide access into the housing 12, and further direct light from within the housing 12 into the surrounding environment in order to attract flying insects. The panel apertures 32 may optionally be backlighted with translights, or other sources of illumination.

Indicia 34, such as numbers, letters, designs, symbols, trademarks, logos, advertising and slogans may also be printed on the front cover. Preferably, the panel aperture(s) 32 are incorporated into the design and shape of the indicia 34.

A first guide bracket 36 is preferably provided on the front side 24 of the housing 12 in proximity to one side of the upper housing aperture 26. Likewise, a second guide bracket 38 is also preferably provided on the front side 24 of the housing 12 in proximity to the opposite side of the upper housing aperture 26. The first and second guide brackets 36, 38 are sized and positioned to slidably receive the removable front panel 30 therebetween.

The removable front panel 30 is sized to substantially cover the upper housing aperture 26, when installed between the opposing first and second guide brackets 36, 38. The removable front panel 30 is preferably of a dark color or shade, which serves to highlight the light passing through the panel aperture(s) 32 located in the removable front panel 30 from the light source located within the housing 12.

Figure 8:
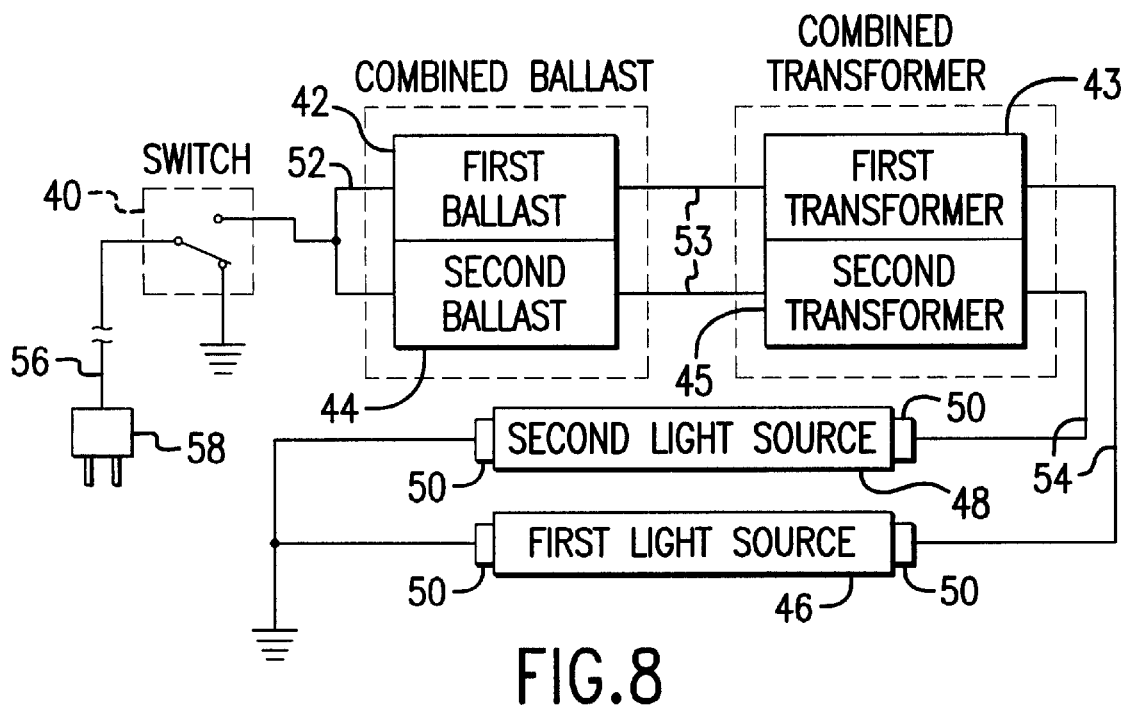
FIG. 8 is a schematic diagram showing the interrelationship of the electronic components of this invention.
Figure 9:
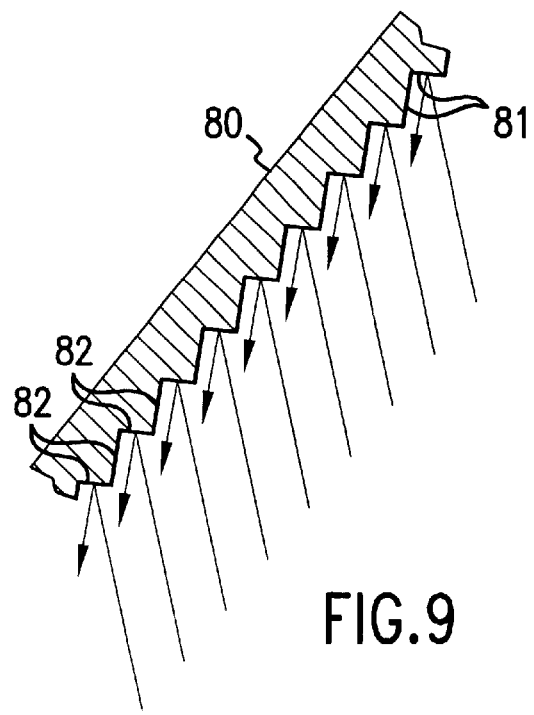
FIG. 9 is partial cross sectional view of the reflective sheet having a plurality of elongated reflective surfaces positioned to redirect the light within the housing.

A control switch 40 is preferably mounted on the housing 12. While the control switch 40 is shown in FIG. 1 to be mounted on the first side 16, it may alternately be mounted on the front side 24, the top side 18, the second side 20, the bottom side 14, or the back side 22 to suit manufacturing preference. Alternately, the control switch 40 may be mounted upon the electrical cord 56 in a manner well known in the art. The control switch 40 may be a simple on, off switch as shown in FIG. 8. Preferably, the control switch 40 comprises at least three of the following positions: an on position; an off position; an alternating above and below the threshold frequency position; a dual above and below threshold frequency position; a selected below the threshold frequency position; a selected above the threshold frequency position; and a cyclic stop and start frequency position.

Figure 2:
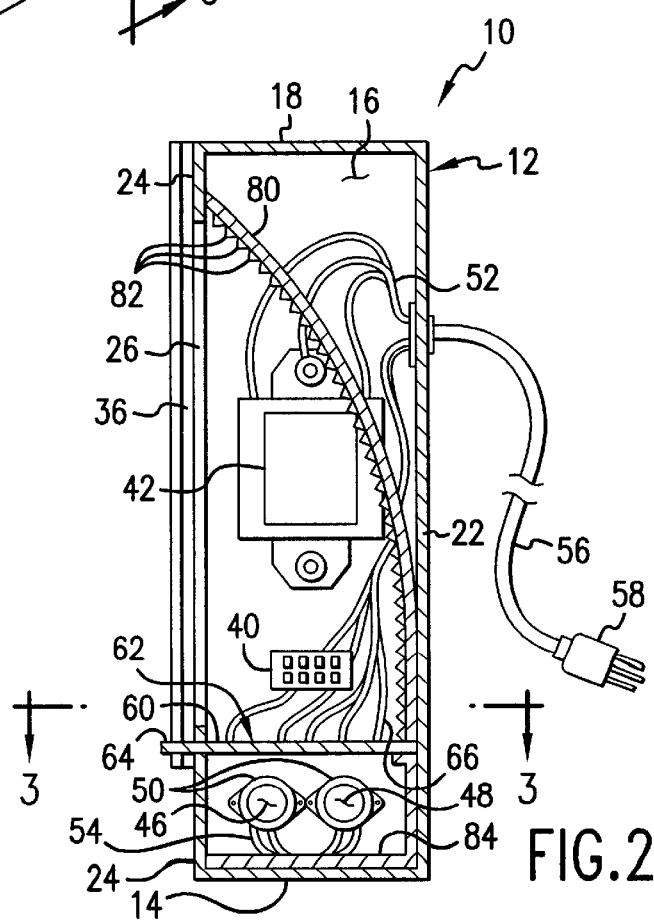
FIG. 2 is a cross sectional view of the first side of the electronic fly trap apparatus taken along lines 2—2 in FIG. 1.
Figure 3:
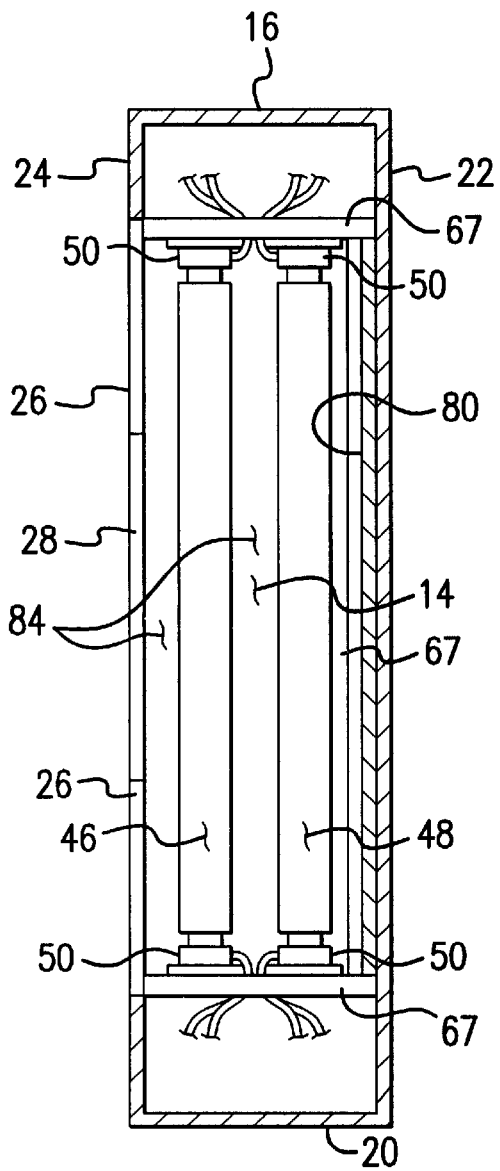
FIG. 3 is a cross section view of the bottom portion of the electronic fly trap apparatus showing two side by side lights, taken along lines 3—3 in FIG. 2.

FIG. 2 is a cross sectional view of the electronic fly trap apparatus 10 taken along line 2—2 of FIG. 1. A first electrical ballast 42 is mounted within the housing 12 along the first side 16. The first electrical ballast 42 converts electric current passing through the electrical cord 56 from a remote source (not shown), to a predetermined Hertz (Hz) frequency used to drive and illuminate a first light source 46.

Preferably, a first transformer 43 is in electrical communication with the first electrical ballast 42 to convert the pre-determined Hz frequency to a selected Hz frequency. Preferably, the first light source 46 and the second light source 48 are each fluorescent light sources. Both the first light source 46 and the second light source 48 may be powered by a single electrical ballast 42. Preferably, a first transformer 43 is provided between the first ballast 42 and the first light source 46. Alternately, a first and second electrical ballast 42, 44 and a first and second transformer 43, 45 may be used, as shown in FIG. 6, FIG. 7 and FIG. 8.

Preferably, the first light source 46 and the second light source 48 are driven at substantially different frequencies, one frequency set below a threshold frequency in Hz, and the other frequency set above a threshold frequency in Hz, the threshold frequency preferably being selected to be from a range of 100 Hz to 1000 Hz. The threshold frequency may be, for example 500 Hz. The first light source 46 may, for example, be in the frequency range of 50–60 Hz, while the second light source 48, for example, may be in the frequency range of one Kilohertz. This combination produces enhanced attraction to flying insects, with differences in the strobe effect from each light source 46, 48 and from the Ramen Scattering effect of the light waves, as well as from an audible sound generated by each light frequency, which are preferably selected to mimic the frequency generated by a fly's wing-beat.

Preferably, the multiple frequencies contain permutations both above and below the threshold frequency, and the frequencies may be further varied by cycling the electrical ballast 42, 44 and/or the transformer 43, 45 off and on to enhance the strobe effect. The alternating cycling of frequencies serves to enhance the visual queues to the target insects. Low frequencies also create audible harmonics, which simulate the wingbeat frequencies of the target flying insects. This enhances the attraction of the target insect species, such as flies. The first light source 46 and the second light source 48, when driven at substantially different frequencies, create different flickering patterns and sounds, which attract flying insects.

Figure 6:
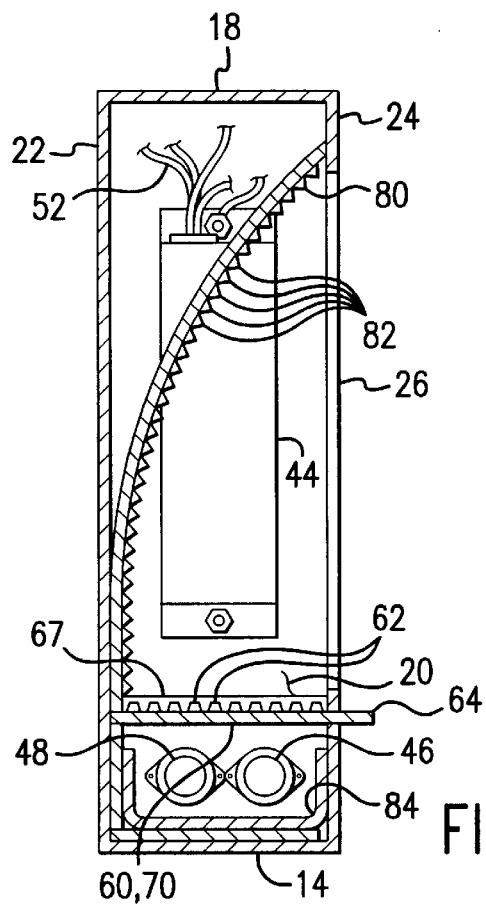
FIG. 6 is a cross sectional view of the fly trap apparatus taken along lines 6—6 in FIG. 1.

While the first and second electrical ballast 42, 44 and first and second transformers 43, 45 are shown in FIG. 2, FIG. 6 and FIG. 7 as being mounted on opposing sides 16, 20 of the housing 12, the first and second electrical ballast 42, 44 and first and second transformers 43, 45 may alternately be mounted beneath the light source(s) 46 and/or 48, or behind the reflective panel 70 or beneath the top side 18, to suit manufacturing preference.

Preferably, a single electrical ballast 42 and variable transformer 43 may be adapted to provide multiple, alternating, or varying frequencies. Variable frequencies provide a changing pattern of flickering light and multiple sound attractive to flying insects, such as flies. Tests have shown that flies are attracted to a wide range of frequencies, and that multiple frequencies increase their interest, resulting in more flies captured in controlled tests, in a shorter time period.

The first and second light source(s) 46 are preferably mounted in suitable light sockets 50 mounted within the housing 12 for ease of insertion, removal and replacement. The light sockets 50 are electrically connected by insulated electrical wiring 54 to the respective transformers 43, 45, which in turn are electrically connected by insulated electrical wiring 53 to the electrical ballast 42, 44. The ballast 42, 44 are in turn connected by insulated electrical wiring 52 to the control switch 40. As previously noted, the control switch 40 is connected by an insulated electrical cord 56 to an external electrical plug 58 for releasable connection to a remote electrical socket (not shown), which in turn is connected to a remote source of electrical power (also not shown).

A disposable sheet 60 is positioned above the first and second light sources 46, 48, as shown in FIG. 2 and FIG. 6. The disposable sheet 60 has a plurality of apertures 81 for transmitting light and heat therethrough. The plurality of apertures 81 extend through the light transmissive sheet 60. Each of the plurality of apertures 81 is sized to restrict passage of flying insects, such as a fly, therethrough. The disposable sheet 60 is preferably a light transmissive thermoplastic sheet. The disposable sheet 60 preferably has a front tab 64 extending partially along one side. The front tab 64 is sized to be closely received in a tab slot 28 provided on the front side 24 of the housing 12, to aid in positioning the disposable sheet within the housing 12. The front tab 64 preferably extends beyond the front aperture 26 housing 12, to position and align the disposable sheet 60 above the light source(s) 46, 48.

Figure 5:
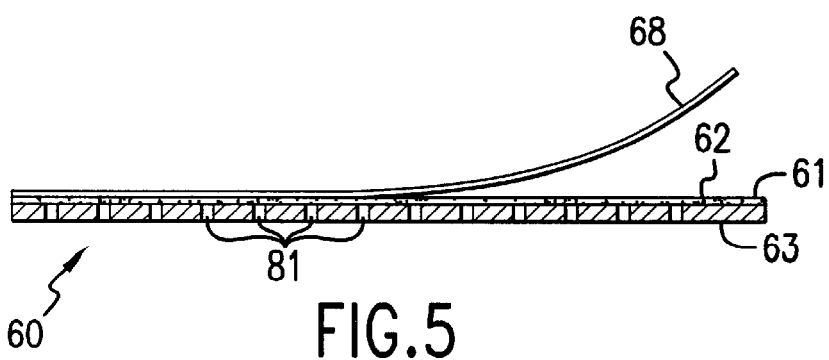
FIG. 5 is an end view of the disposable sheet shown in FIG. 4, showing the sticky surface located above the disposable sheet, with a release paper still attached to the sticky surface.

As best shown in FIG. 5, a sticky adhesive 62 is supplied upon the upper surface 61 of the disposable sheet 60. The plurality of apertures 81 in the disposable sheet 60 serve to enhance the passage of visible light and heat passing through the disposable sheet 60. The sticky adhesive 62 preferably does not extend onto the front tab 64.

The front tab 64 allows the user to easily remove and replace the disposable light transmissive sheet 60 from the slots 76, without coming in direct contact with the sticky adhesive 62, and without coming in direct contact with flies and other flying insects captured thereon. A release paper 68 is preferably placed over the sticky adhesive 62 prior to use, for ease of shipping and handling. After use, the disposable light transmissive sheet 60 may be removed from the housing 12 and discarded. A new disposable light transmissive sheet 60 is then placed within the housing 12 above the first and second light sources 46, 48.

Figure 4A:
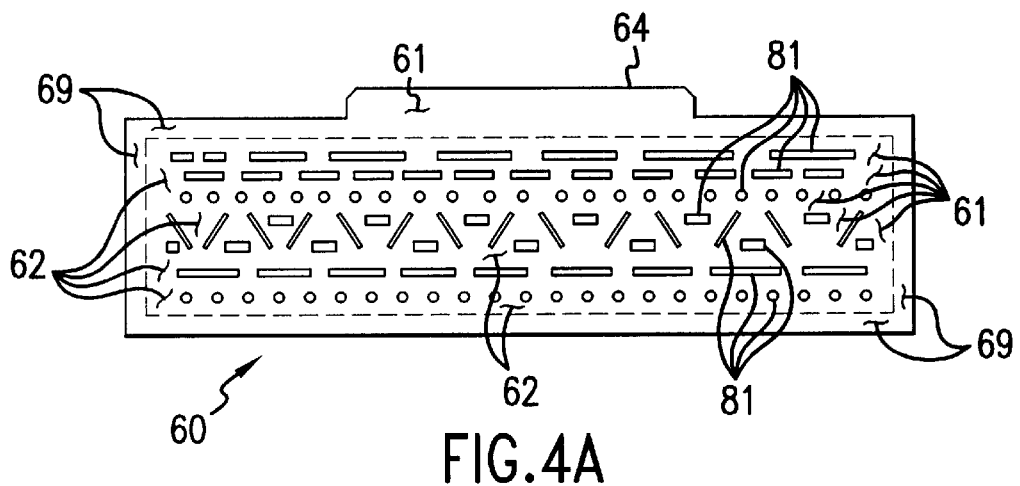
FIG. 4A is a top view of the disposable sheet having an upper sticky surface, with a plurality of variable sized apertures therethrough.
Figure 4B:
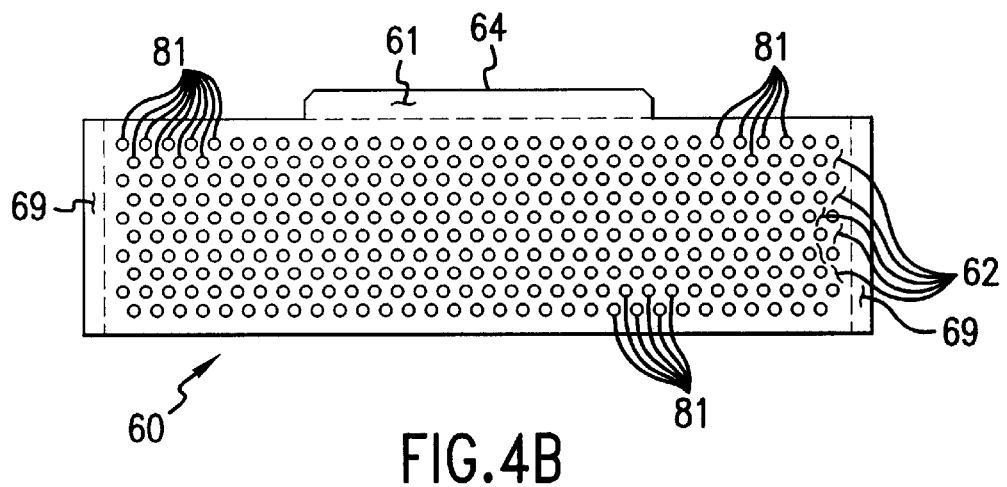
FIG. 4B is top view of an alternate disposable sheet having an upper sticky surface, with a plurality of parallel, elongated apertures therethrough.
Figure 4C:
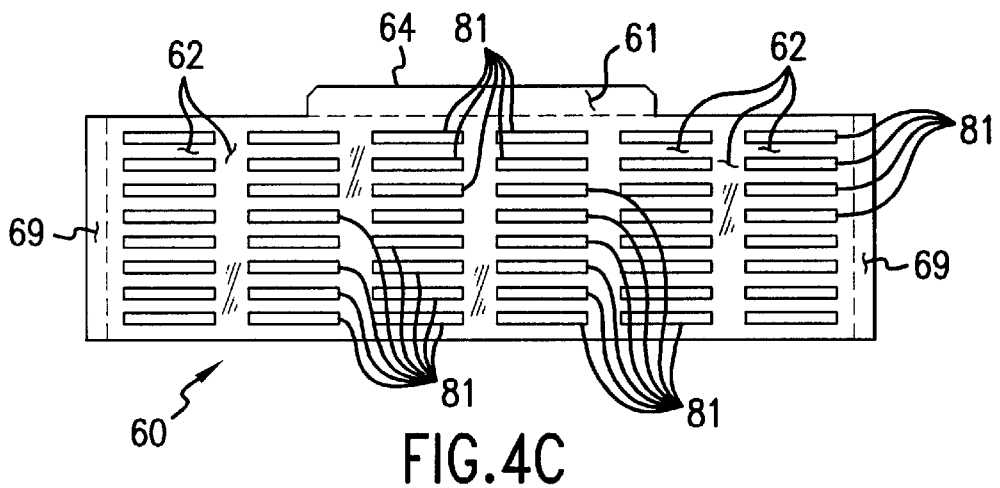
FIG. 4C is a top view of an alternate disposable sheet having an upper sticky surface, with a plurality of similar sized apertures therethrough.

The plurality of apertures 81 in the disposable sheet 60 form primary patterns of light as the light from the light sources 46, 48 passes through the plurality of apertures 81. As shown in FIG. 4A, FIG. 4B and FIG. 4C, the plurality of apertures 81 in the disposable sheet 60 may be provided in a plurality of shapes, sizes and patterns 65 to aid attracting flying insects. Preferably, the disposable sheet 60 is a disposable light transmissive sheet 60, which passes additional secondary light from the light source(s) 46, 48 into the housing 12 through the disposable light transmissive sheet 60. Thus primary patterns of light in the form of bright spots of light pass through the plurality of apertures 81, while secondary light passes through the disposable light transmissive sheet 60 and the sticky adhesive 62. The light patterns 65 may be in the form of triangles, pyramids, octagons, zigzag patterns, elongated slots, or multi-sided shapes. The plurality of apertures 81 forming the light patterns 65 may be molded, stamped, or otherwise cut through the disposable light transmissive sheet 60.

An upper reflective panel 80 is positioned to extend behind and above the disposable light transmissive sheet 60, located within the housing 12. The upper reflective panel 80 is preferably curved to redirect the light passing through the plurality of apertures 81 in the disposable sheet 60. The redirected light passes out through the panel aperture(s) 32 located on the removable front panel 30. The reflective panel 80 may include a plurality of angular reflective ridges and grooves 82, similar to a fresnel lens. Preferably the plurality of angular reflective strips 82 are angled to redirect light out through the panel aperture(s) 32.

A lower reflective panel 84 is preferably positioned beneath the light source(s) 46, 48. The lower reflective panel 84 is preferably curved, to redirect light emitted by the light source(s) 46, 48, up through the plurality of apertures 81 in the disposable sheet 70. The lower reflective panel 84 increases the amount of light passing through the plurality of apertures 81, which in turn increases the effectiveness of the electronic fly trap apparatus 10.

Preferably, as shown in FIG. 6, the light sockets 50 are secured to the lower reflective panel 84 at a location above the lower reflective panel 84, and the electrical ballast(s) 42, 44 and the electrical transformer(s) 43, 45 are secured to the lower reflective panel 84 at a location below the lower reflective panel 84. This simplifies wiling, while allowing the electrical components of the electronic fly trap apparatus 10 to be easily removed from the housing 12, for ease of servicing and maintenance.

In use, the electronic fly trap apparatus 10 is placed in a desired location on a wall, suspended from above, or placed on a table or countertop. A mounting means, such as a bracket, screw or nail (not shown) may be used to secure the housing 12 in the desired location, in a manner well known in the art. Once secured, an electrical plug 58 is placed in a remote electric socket (not shown), so that electric power is transferred through the electrical cord 56 to the control switch 40 mounted on the housing 12.

When the control switch 40 is actuated to an "on" position, electric power passes through the electrical wiring 52 to the first and/or second ballast 42, 44. Electrical power passing through the first and/or second ballast 42, 44, exits the ballast 42, 44 at a pre-determined Hz frequency. A first and/or second transformer 43, 45 is preferably in electrical communication with the first and/or second ballast 42, 44. The first and/or second transformer 43, 45 converts the predetermined Hz frequency from the ballast 42, 44 into a controlled, selected, alternating or oscillating Hz frequency, preferably selected to be above and below a given threshold frequency, over suitable electrical wiring 53, 54 to respective light socket(s) 50 to energize the first and/or second light sources 46, 48.

The first and second ballast 42, 44 and the first and second transformers 43, 45 may be oscillated or cycled to provide oscillating or intermittent power to the first and second light sources 46, 48. The light sources 46, 48 are preferably fluorescent light sources. The primary emitted light passes through the plurality of apertures 81 in the disposable transparent sheet 60, while muted and diffused secondary light passes through the disposable light transmissive panel and through the sticky adhesive 62.

The light within the housing 12 is reflected by the upper reflective panel 80, which redirects the light through at least one panel aperture 32 in the removable front panel 30, to attract flying insects in line of sight contact with the reflected light.

Flies, and other flying insects, approach the light source, and enter through the elongated panel aperture(s) 32. Once inside the housing 12, they land on the sticky adhesive 62 while attracted to the source of the light and sound produced by selected frequencies generated by the ballast(s) 42, 44, the transformer(s) 43, 45 and the plural light source(s) 46, 48. The intensity of the primary and secondary light source within the housing 12 is significantly more intense than the light passing through the removable front panel apertures 32, which further encourages the flies and other flying insects to enter the housing 12 to seek the source of light.

Once in contact with the sticky adhesive 62, the flies and other flying insects cannot escape. Thus, they are captured and restrained from further contact with the area surrounding the fly trap apparatus 10.

For periodic cleaning, the switch 40 is turned off, and the removable front panel 30 is raised to expose the front aperture 26. The disposable transparent sheet 60 may then be easily removed from the slots 76 provided, which also removes the captured flying insects from the housing 12. The light sources 46, 48 are substantially protected from being spotted by flies as the files cannot pass through the plurality of apertures 81 in the disposable sheet 60 to come in direct contact with the light sources 46, 48.

The removable front panel 30 may be easily cleaned or replaced as needed, and a new disposable sheet 60 placed within the housing 12 above the light sources 46, 48. The removable front panel 30 is then lowered in the guide brackets 36, 38, the switch is turned on, and the fly trap apparatus 10 is ready to resume its entrapment of flies and other flying insects from the vicinity of the fly trap apparatus 10.

The indicia 34 on the removable front panel 30 may be adapted to serve as advertising, double as a sign, or as an attractive decoration. Preferably, the access aperture(s) 32 in the front panel 30 are positioned to conform to the indicia 34 placed on the front panel 30. The removable front panel 30 may be periodically replaced to provide a new look, to change the ambiance in a room, or to conform to a change in decorator color or style, or to change the advertising placed thereon.

Each disposable transparent sheet 60 is preferably sized to capture more than one hundred flies and other flying insects. Once the sticky adhesive 62 is substantially full of flies, it should be replaced. The need for replacement varies by season, and the number of flies present in the vicinity of the electronic fly trap apparatus 10.

Although the invention has been described in detail in the foregoing embodiments for the purpose of illustration, it is to be understood that such detail is solely for that purpose, and that variations can be made therein by those skilled in the art without departing from the spirit and scope of the invention, except as it may be described by the following claims.

What is claimed is:

1. An electronic fly trap apparatus, comprising:
   a) a housing having a bottom side, a first side, a top side, a second side, a back side and a front side, the front side having an upper front aperture extending at least half the width of the upper portion of the front side of the electronic fly trap apparatus;
   b) a front panel sized to substantially cover the upper front aperture located on the front side of the housing, said front panel releasably secured to said front side of said housing, said front panel includes at least one elongated access aperture sized to provide access by a fly into the housing;
   c) at least one electrical ballast mounted within the housing, said ballast to convert electric current from a remote source into at least one pre-determined Hz frequency;
   d) at least one electrical transformer mounted within the housing for converting the first pre-determined Hz frequency into a selected Hz frequency comprising at least one of: an alternating Hz frequency, a multiple Hz frequency, a cyclic Hz frequency, and an intermittent Hz frequency;

e) at least one light source located in a lower portion of the housing, the first light source in electrical communication with said electrical ballast and said electrical transformer;

f) a disposable sheet positioned above said at least one light source, the disposable sheet having a plurality of apertures extending therethrough, each of the plurality of apertures sized to restrict passage of a fly therethrough, the plurality of apertures positioned on the disposable sheet to allow light and heat to pass therethrough;

g) a sticky adhesive disposed upon the upper surface of the disposable sheet;

h) an upper reflective panel positioned within the housing to extend behind and above the disposable sheet, the upper reflective panel positioned to reflect light passing from said light source through said plurality of apertures in said disposable sheet, and to redirect said light out through at least one of said elongated access aperture(s);

i) a lower reflective panel positioned within the housing to extend below the at least one light source, said lower reflective panel to redirect light from said at least one light source through said plurality of apertures in said disposable sheet; and j) a control switch positioned between a remote electrical source and said electronic ballast, and said control switch comprises at least three of the following positions: an on position, an off position, an alternating above and below the threshold frequency position, a dual above and below threshold frequency position, a selected below the threshold frequency position, a selected above the threshold frequency position, and a cyclic stop and start frequency position.

2. The electronic fly trap apparatus of claim 1, wherein the front panel is slidably received in opposing brackets located on opposite sides of the front panel aperture.

3. The electronic fly trap apparatus of claim 1, wherein said light source is a fluorescent light source.

4. The electronic fly trap apparatus of claim 1, wherein the disposable sheet is a light transmissive sheet, and the plurality of apertures in the disposable sheet are positioned to form primary patterns of light as the light passes through the plurality of apertures in the disposable sheet, and the light transmissive sheet with sticky adhesive thereon provides passage of secondary light between the light transmissive sheet and the upper reflective panel.

5. The electronic fly trap apparatus of claim 1, wherein the upper reflective panel contains a plurality of ridges and grooves which are positioned to receive light passing through said plurality of apertures in said disposable sheet from said at least one light source, and to redirect said light to pass said light through said at least one access aperture in said front panel.

6. The electronic fly trap apparatus of claim 1, wherein advertising indicia is placed upon the front panel, and said at least one access aperture conforms to the advertising indicia located on said front panel.

7. The electronic fly trap apparatus of claim 1, wherein the disposable sheet includes a front lip which extends beyond the front face of the housing when the disposable sheet is mounted in the housing above the light source, and wherein the front lip is not covered with sticky adhesive.

8. The electronic fly trap apparatus of claim 1, wherein a peelable protective sheet is sized to cover the sticky adhesive on the disposable sheet prior to installation of the disposable sheet in said housing, for ease of transport and storage.

9. The electronic fly trap apparatus of claim 1, wherein the opposing ends of the disposable sheet are kept free of sticky adhesive to facilitate the insertion of the opposing ends of the disposable sheet into slots provided on opposing sides of the cover aperture, at a location just above the bottom of the cover aperture.

10. The electronic fly trap apparatus of claim 1, wherein the upper reflective panel is a curved reflective panel having a plurality of ridges and grooves thereon, said ridges and grooves positioned to redirect light from the light source(s) out through said at least one aperture in said removable front panel.

11. An electronic fly trap apparatus, comprising:

a) a housing having a bottom side, a first side, a top side, a second side, a back side and a front side, the front side having an upper front aperture extending at least half the width of the front side of the electronic fly trap apparatus;

b) a removable front panel sized to substantially cover the upper front aperture located on the front side of the housing, said removable front panel slidably received in opposing brackets located on opposite sides of the front panel aperture, said removable front panel includes at least one elongated access aperture sized to provide access by a fly into the housing;

c) a threshold frequency selected to be between 100 Hz and 1,000 MHz;

d) a first electrical ballast mounted within the housing, the first ballast to convert electric current from a remote source into a first pre-determined Hz frequency which is below said selected threshold frequency;

e) a second electrical ballast mounted within the housing, the second ballast to convert electric current from a remote electrical source into a second pre-determined Hz frequency which is above said selected threshold frequency;

f) a first electrical transformer in electrical communication with said first electrical ballast, said first transformer for converting said first pre-determined Hz frequency into a selected Hz frequency which is below said selected threshold frequency;

g) a second electrical transformer in electrical communication with said second electrical ballast, said second electrical transformer for converting said second pre-determined Hz frequency into a selected Hz frequency which is above said selected threshold frequency;

h) a first fluorescent light source located in a lower portion of the housing, the first light source in electrical communication with the first electrical transformer;

i) a second fluorescent light source located in a lower portion of the housing, the second light source in electrical communication with the second electrical transformer;

j) a light transmissive disposable sheet positioned above the first and second light sources, the disposable sheet having a plurality of apertures extending therethrough, each aperture sized to restrict passage of a fly therethrough, the plurality of apertures positioned on the disposable sheet to allow light and heat from the first light source and the second light source to pass therethrough, the plurality of apertures positioned to form primary patterns of light as the light passes through the plurality of apertures, and the light transmissive sheet provides passage of secondary light through the light transmissive disposable sheet;

k) a sticky adhesive disposed upon the upper surface of the light transmissive disposable sheet;

l) a curved reflective panel positioned within the housing to extend behind and above the disposable light transmissive sheet, the curved reflective panel positioned to redirect light from the first and second light sources, out through at least one of the elongated access apertures located on the removable front panel.

12. The electronic fly trap apparatus of claim 11, wherein the curved reflective panel contains a plurality of ridges and grooves which are positioned to receive light from the light source, and to redirect said light to pass through said at least one fly access aperture in said front panel.

13. The electronic fly trap apparatus of claim 11, wherein a control switch is positioned between a remote electrical source and said electronic ballast, and said control switch comprises at least three of the following positions: an on position, an off position, an alternating above and below the threshold frequency position, a sustained above and below threshold frequency position, a selected below the threshold frequency position, a selected above the threshold frequency position, and a cyclic stop and start frequency position.

14. The electronic fly trap apparatus of claim 11, wherein advertising indicia is placed upon the front face of the front panel, and said access aperture(s) are positioned to conform to said advertising indicia.

15. The electronic fly trap apparatus of claim 11, wherein the disposable sheet includes a front lip which extends beyond the front face of the housing when the disposable sheet is mounted in the housing above the light source, and wherein the front lip is not covered with sticky adhesive.

16. The electronic fly trap apparatus of claim 11, wherein a peelable protective sheet is sized to cover the sticky adhesive prior to installation in said housing, for ease of transport and storage.

17. The electronic fly trap apparatus of claim 11, wherein a lower reflective material is positioned in the housing, below the light source, to redirect light up through the plurality of apertures in the disposable sheet.

18. An electronic fly trap apparatus, comprising:

a) a housing having a bottom side, a first side, a top side, a second side, a back side and a front side, the front side having an upper front aperture extending at least half the width and at least half the height of the front side of the electronic fly trap apparatus;

b) a front panel sized to substantially cover the upper front aperture located on the front side of the housing, said front panel slidably received in opposing brackets located on opposite sides of the front panel aperture, said front panel includes at least one elongated fly access aperture therethrough;

c) a first electrical ballast mounted within the housing, the first ballast to convert electric current from a remote source into a first pre-determined Hertz frequency which is below a selected threshold frequency;

d) a second electrical ballast mounted within the housing, the second ballast to convert electric current from a remote electrical source into a second pre-determined Hertz frequency which is above said selected threshold frequency, said threshold frequency selected to be from 100 Hertz to 1000 Hertz;

e) a first electrical transformer in electrical communication with said first electrical ballast for converting said first pre-determined Hz frequency to a first selected Hz frequency which is below a selected threshold frequency;

f) a second electrical transformer in electrical communication with said second electrical ballast for converting said second pre-determined Hz frequency to a second selected Hz frequency which is below a selected threshold frequency;

g) a first fluorescent light source located in a lower portion of the housing, the first light source in electrical communication with said first electrical transformer;

h) a second fluorescent light source located in a lower portion of the housing, the second light source in electrical communication with the second electrical transformer;

i) a light transmissive disposable sheet positioned to extend above the first and second light sources, the light transmissive disposable sheet having a plurality of apertures extending therethrough, each aperture sized to restrict passage of a fly therethrough, the plurality of apertures positioned on the disposable light transmissive sheet to allow primary light from the first light source and the second light source to pass therethrough, and the plurality of apertures in the disposable sheet positioned to form primary patterns of light as the light passes through the plurality of apertures in the light transmissive disposable sheet, and the light transmissive sheet with sticky adhesive thereon provides passage of secondary light between the light transmissive sheet and the curved reflective panel;

j) a sticky adhesive disposed upon the upper surface of the disposable sheet;

k) a first curved, upper light reflective panel positioned within the housing to extend behind and above the disposable light transmissive sheet, the first curved, upper light reflective panel positioned to redirect light from the first and second light sources, out through at least one of the elongated access apertures, and l) a second light reflective panel positioned below the first and second fluorescent light sources to redirect light from the first and second light sources up through the plurality of apertures in the disposable light transmissive sheet.

* * * * *